United States Patent [19]
Hasselbring

[11] Patent Number: 5,717,390
[45] Date of Patent: Feb. 10, 1998

[54] DOPPLER-RADAR BASED AUTOMATIC VEHICLE-CLASSIFICATION SYSTEM

[76] Inventor: Richard E. Hasselbring, 3040 Browning St., San Diego, Calif. 92106

[21] Appl. No.: 406,746

[22] Filed: Mar. 20, 1995

[51] Int. Cl.$^6$ .................................................. G08G 1/01
[52] U.S. Cl. .................... 340/933; 340/937; 235/379; 235/380; 235/384; 342/44; 342/51; 364/436
[58] Field of Search .................... 340/933, 936, 340/943, 941, 942, 940, 937; 235/379, 380, 382, 384; 342/42, 44, 50, 51; 364/436; 367/97

[56] References Cited

U.S. PATENT DOCUMENTS

| | | | |
|---|---|---|---|
| 3,750,171 | 7/1973 | Faris | 343/9 |
| 3,846,820 | 11/1974 | Lampe | 357/31 |
| 4,117,481 | 9/1978 | Constant | 343/6.5 |
| 5,087,918 | 2/1992 | May | 342/85 |
| 5,101,200 | 3/1992 | Swett | 364/456 |
| 5,278,563 | 1/1994 | Spiess | 342/44 |

OTHER PUBLICATIONS

—Applicant's P.T.O./Disclosure Document #358,610 Filed: Jul. 29, 1994.

*Primary Examiner*—Jeffrey Hofsass
*Assistant Examiner*—Nina Tong

[57] ABSTRACT

A method for automatically categorizing the general variety of motor-vehicle types moving through a given checkpoint, according to their predominant characteristics; basically involving features such as length, height, axle count, existence of a trailer, and specific envelop contour (i.e.—motorcycle, car, truck, bus, limousine, etc.). Advantageously employing Doppler-based CW-radar for ultimate real-time accuracy, resolving even closely spaced vehicles having differing acceleration/deceleration rates; the system will establish a vehicle's classification during stop-and-go or at speed. Real-time velocity information is read from successively radar targeted vehicles, while combined with real-time information acquired via at least one special electronic profiling-window apparatus employing beam emitters/receptors or lasers in making incremental transverse-slice readings of traversing vehicles. Readings are assembled by data-processor into a longitudinal dot-matrix pattern, and compared to pre-established vehicle profiles, for segregation into particular vehicle-classification types for toll-charge auditing.

21 Claims, 4 Drawing Sheets

FIG 2
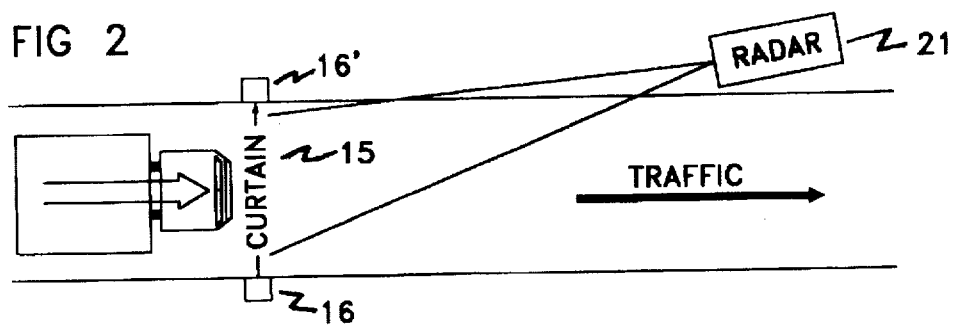
FIG 3/A
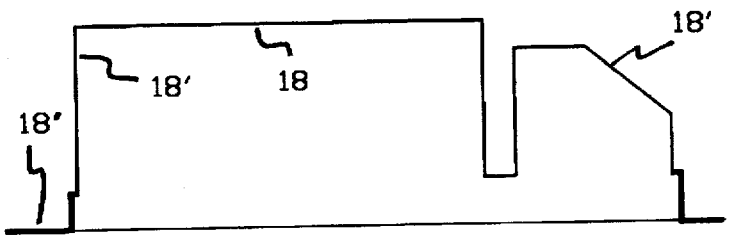
FIG 3/B
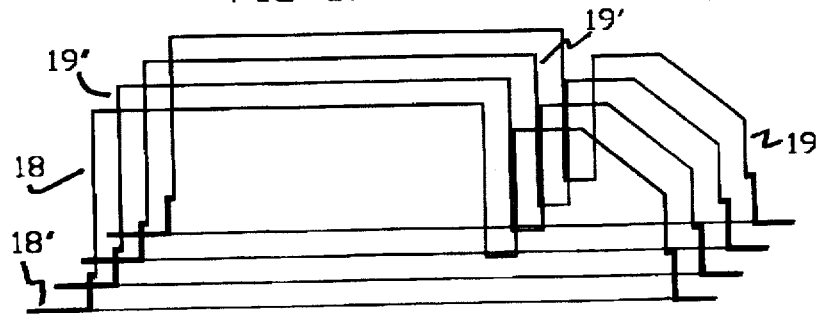
FIG 4
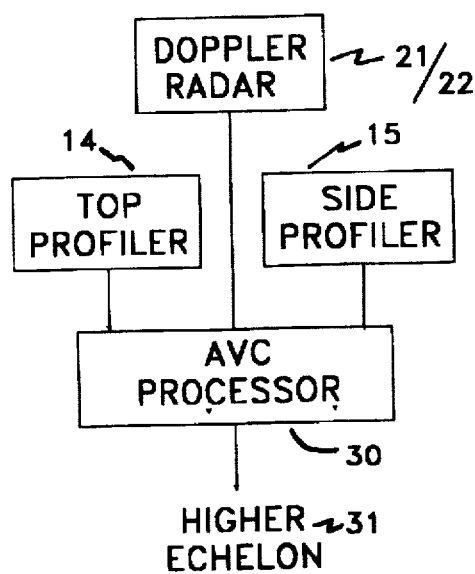

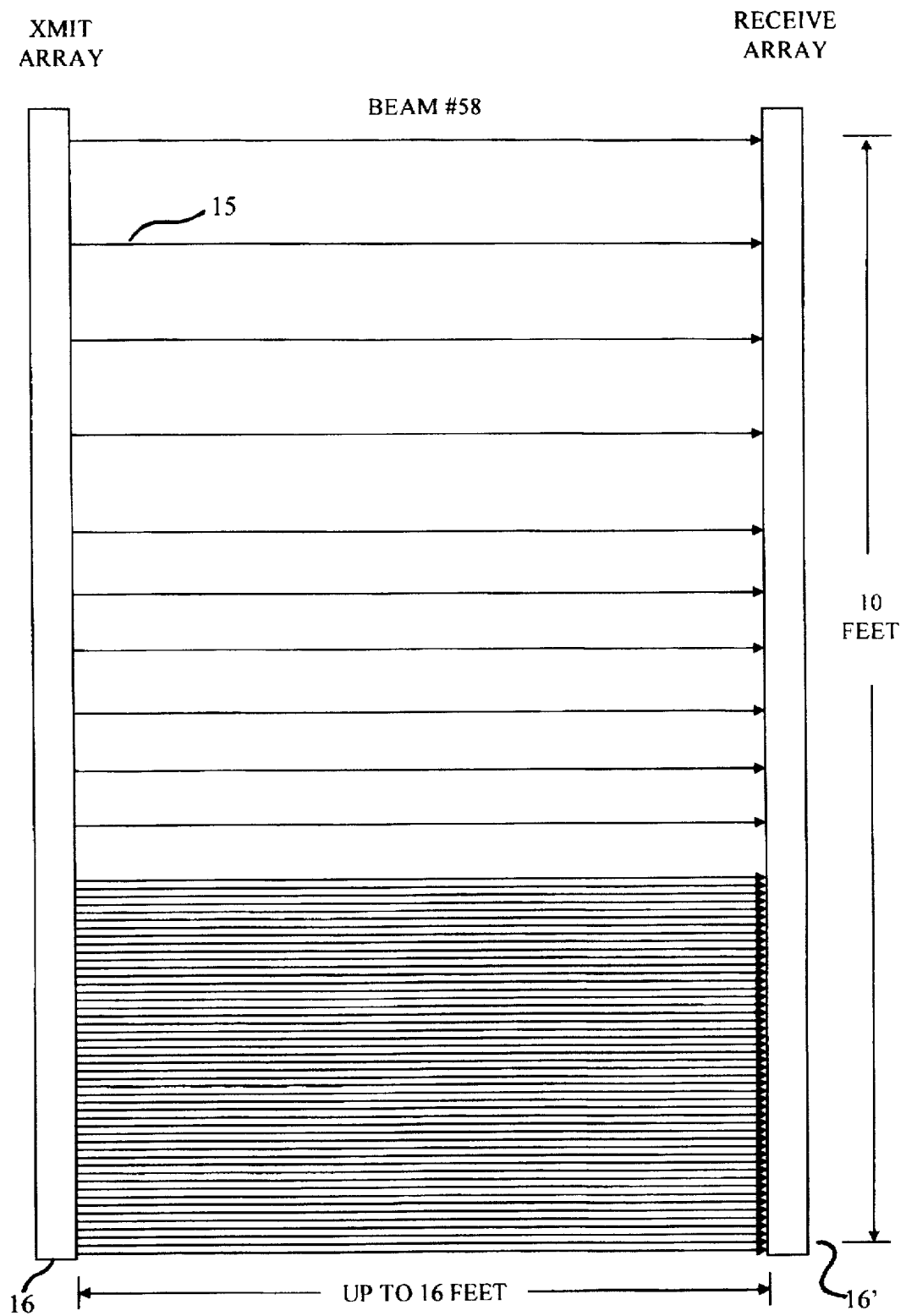

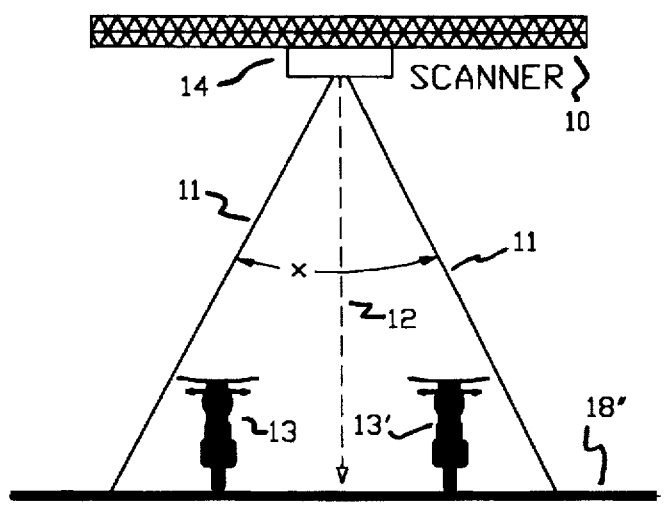
FIG 6/A
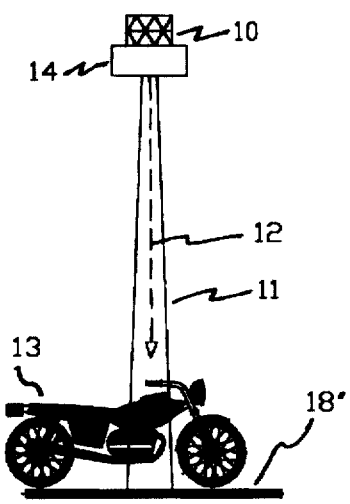
FIG 6/B
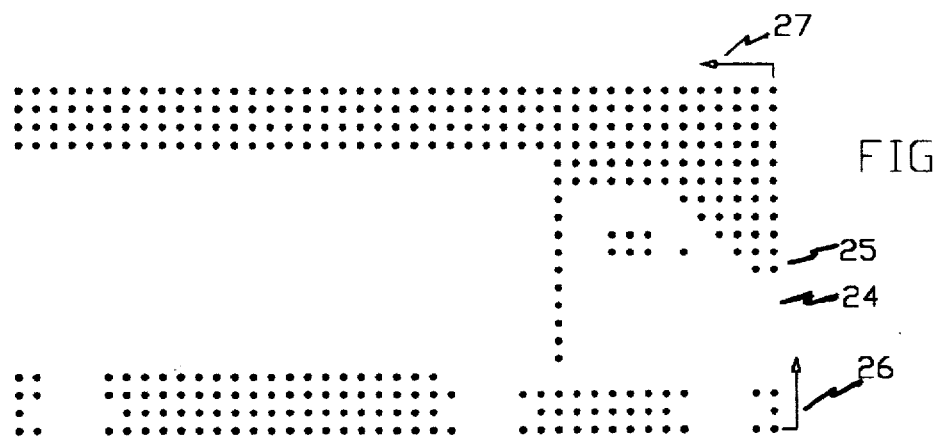
FIG 7/A
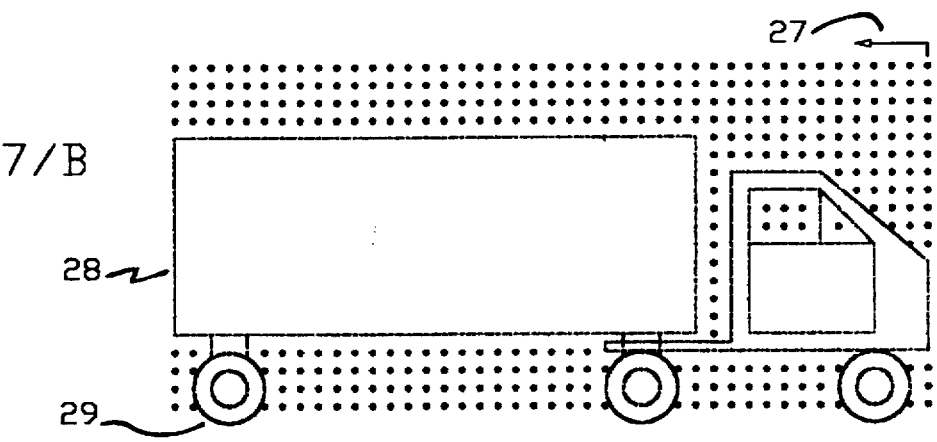
FIG 7/B

DOPPLER-RADAR BASED AUTOMATIC VEHICLE-CLASSIFICATION SYSTEM

BACKGROUND OF RELEVANT EARLIER INVENTION

This invention relates both to Doppler-radar, and in particular to automated toll-road user paying systems; and more specifically, it relates to such systems employing vehicle type identification as the vehicle traverses a control-zone having electronic means for segregating vehicles into classes for accounting, control, and statistical compilation purposes.

The very density of today's highway thoroughfares has come to necessitate some form of automated management system for instant discriminating computation of tolls for various types of wheeled vehicles, ranging for example, from a relatively diminutive motorcycle to a huge semi-truck & dual-trailer rig. Moreover, a need exists in the automated highway industry to be able to identify different classes of moving vehicles (0–100 mph) on a public highway using non-cooperative techniques;—that is to say, a practical cost-effective system, which would thus on a realistic basis, obviate the notion of any on-board vehicle borne device, such as transponder of preprogrammed-data (subject to tampering).

To date, no such system is know available that can rapidly and reliably categorize by vehicle characteristics the various vehicle types which regularly move through a given vehicle checkpoint. This is because in addition to weight, desirable vehicle characterization parameters generally include such variables as: length, height, axle-count, presence of trailer, and even specific envelope profile (i.e.—motorcycle, car, truck, trailer, bus, van, limousine, etc.).

Toll roads using manual collection techniques have existed for many years, wherein each vehicle is required to stop and pay a toll, whether to a human toll-collector or to a machine capable of automatically receiving coins. Recent technological advances have led to systems capable of interrogating and thereby automatically identifying vehicles which carry a responding cooperative transponder device. A need has continually existed to enable an automatic audit of both these manual and automatic systems of operation, which could essentially eliminate fraud on either the part of the toll-collector or the operator of a transponder equipped vehicle.

All this, in the midst of tightly clustered "stop-and-go" and even close-interval "at speed" conditions;—heretofore considered just too monumental a task, for even the most sophisticated of electronic-systems regardless as to cost. Hence, although hundreds of new toll-stations are being installed across the United States, no highly effective means of auditing these systems exists. Furthermore, vehicle traffic is projected to grow still further at a significant rate during the next decades. In order to reduce traffic congestion at toll collection points, additional automatic vehicle-identification systems will be installed, which shall also stimulate additional requirements for AVC based audit-systems.

Background research discovery provides some prior patent-art regarded as germane to this disclosure, chronologically for example U.S. Pat. No. 3,846,820 (filed: June 1973) contemplates a mosaic for IR (Infrared)-imaging using pyroelectric sensors in a bipolar grid-like transistor array. This patent does not concern itself so much with application, as rather disclosure of an imaging means capable of rapid sequential scanning employing rugged solid-state apparatus; and as such, is cited only as a general representation of invention whose fabrication is deemed compatible with IC (Integrated-circuit) technology.

In U.S. Pat. No. 3,750,171 (filed: September 1970) to Bendix Corp., a diplexed multi-frequency CW (continuous wave) Doppler-radar system is disclosed for use in the measurement of range and relative velocities between two vehicles. Doppler signals resulting from the reception of radiated energy reflected from a target vehicle are gated to provide two composite Doppler-signals. Range to the target is proportional to the phase-angle between the composite Doppler-tones, and range-rate is proportional to the frequency of the composite signal. The system is employed both as an automatic highway speed-control for motor-vehicles, as well as for collision-avoidance purposes; thus interacting with both the existing throttle and braking systems of the vehicle in which it is mounted and does not contemplate any matter of AVC function.

In U.S. Pat. No. 4,117,481 (filed: March 1977) a side-looking Doppler-radar system for identifying objects is set forth, in which the vehicle being examined moves relative to the radar source and is provided with an encoded-label bearing predetermined information. Such encoded-labels lack tamper-resistance, and can become obscured by road-dirt for example, among other apparent shortcomings for toll-service adaptation.

In U.S. Pat. No. 5,087,918 (filed: February 1992) shows an FM (freq. modulated) CW two-frequency Doppler-radar signal system, which is adapted for use upon the vehicle for detection of near-objects, such as during parking or in close traffic conditions.

Therefore, in full consideration of the limited preceding patent review, there has been found no anticipation of employing Doppler-radar in combination with an AVC function. Accordingly, there is determined a need for an improved form of device to which these patents have been largely addressed. The instant inventor hereof believes their new automated vehicle-classification system, commercially referred to presently as the N/AVC (Non-cooperative/Automatic Vehicle Classification)-system, currently being developed for production under auspices of TDS (Transport Data Systems)-Corp., exhibits certain advantages as shall be revealed in the subsequent portion of the instant disclosure.

SUMMARY OF THE INVENTION

A.) In view of the foregoing discussion about the earlier invention art, it is therefore important to make it pellucid to others interested in the art that the object of this invention is to provide a passive or Non-cooperative/AVC (automatic vehicle-classification)-system capable of separating motor-vehicles into different classes for toll-charge audit determination;—while obviating need for any sort of actively cooperative support device (such as a transponder) situated aboard the road-vehicle. While presence of a transponder, or any other on-board sort of device to actively supplement communication of information to the toll-booth is entirely obviated, in this regard the AVC-system functions in an entirely passive manner, requiring no alteration nor addition to the target-vehicle(s) of any sort. However, it is also an object of this invention to provide a Non-cooperative/AVC-system which is operationally compatible with existing and possible future ETC (electronic toll-collection) transponder based Cooperative/AVI systems.

B.) TRANSVERSE-MEASUREMENT COMPONENT: The essential exteriorly apparent (that which is observable by the public) component of the laterally looking system version hereof, preferably embodies dual-opposed vertical-stanchion lateral-projection fixtures; the first-stanchion employing plural sequentially-tiered lightbeam emissioncells, the second-stanchion employing like plural sequentially-tiered lightbeam receptor-cells, the combination thereby facilitating a continuous rapid-fire operation acting as a penetrable transverse light-curtain staged within the profiling window (that space prevailing even when the light-curtain is shut-off) between the stanchions. As the vehicle traverses the profiling-window, certain of the beams emanating from the emitter-cells become momentarily occluded, registering as non-received emitter-beams of the overall projected light-curtain of emanating beams. This so called "light-curtain" is preferably comprised of IR/emitter-cells (infrared), and provides a practically instantaneous real-time dot-matrix profile-picture facsimile-pattern of the target-vehicle. From this, certain desired information may be identified and extrapolated;—thereby enabling near-instantaneous determination and recording of toll-charge, and still other very useful statistical motivations.

Other advantages of employing the solid-state light-curtain technique reside in elimination of problematical moving-parts such as mechanical-treadles or troublesome to install road-undersurface induction-loops, relative ease of installation and maintenance, high classification-accuracy (greater than 99.5%), ease of modification and updating/upgrading, the ability to expand to include fully automated (manless) lane-controller functions, and easy interfacing with vehicle weigh-in-motion systems. The so called light-curtain provides a method for rapidly determining a considerably detailed and varying 2-dimensional side-elevation profile, as the vehicle progresses through the profiling-window.

Once excellent embodiment for the two opposed sender/receiver-stanchions features a preferred plural array design, the array of LED-emitters and photocell-receivers generally involving a standing height of some 10-feet. The beam-array is preferably vertically-tiered, beginning about 3-inches above the road surface, the first 3-feet preferably containing a concentrated array of 48-cells vertically spaced about ¾-inches apart. The next 3-foot elevation contains 6-cells spaced about 6-inches apart, and the uppermost 4-foot elevation contains 4-cells spaced in 1-foot intervals; hence, preferably totaling some fifty-eight transverse beam projections in all. The transverse beam-projection through distance is preferably about 12 to 16 feet as measured between the two interfacing stanchions; where higher translation-speeds (vehicle velocity traversing the sensory light-curtain window) are expected, the wider interval is naturally employed.

Currently, the electronic requirements are such that the light-curtain xmit/receive-array scan-impulses continuously feed into the data-processor via an RS-232 link operating at 38,400 bps (bits per second), providing usable data on an on-going basis. The serial interface will provide an 8-byte message, containing the data from the preferred 58-beams. This light-curtain configuration essentially senses any vehicular intrusion made into the scanning profiling-window, which is akin to a transverse slice of the vehicle's overall received and non-received (occluded) beam emissions; certain of the beams being momentarily occluded or blocked by portions of the intruding vehicle, so as to thereby generated a recorded real-time dot-matrix facsimile-pattern profile of said vehicle traversing the profiling-window's station-point. Note that the occlusive state of each emitter/receptor pair when polled shall be either negated or conveyed, thereby defining a two-state (on/off) "binary" function.

Another type of alternate beam-emitter/beam-receptor means employable herein is a reflective type arrangement, in place of the previously said preferred (currently far most economical) directly projected infrared LED (light-emitting-diode) devices;—is that of either a laser-beam type device, or, a non-Doppler based radar apparatus. According, for purposes of this disclosure, the use of a surface-reflected signal, or a non-reflected signal arrangement of beam-emitter/beam-receptor components is to be considered tantamount to the same invention functionally speaking. Certainly, it is herein considered workable to employ a reflective type arrangement of components in the side-looking adaptation; however, considering the cost of the infrared spectrum LED's there is presently no intention to implement the reflective arrangement except but in the downward-looking orientation.

Therefore, while the notion of projecting the profiling beam array toward the side-elevation of vehicles is generally herein preferred (in that it also facilitates obtaining "accurate axle-count & location" for example), an optional direction of projection propagation is downward from an overhead position (possibly employing a transverse gantry type of support instead of stanchion supports), so as to similarly obtain sequentially transverse height and width measurements of a vehicle's longitude while traversing the dedicated interrogation lane's profiling-window station of reference. This latter combination thus enables recording of a limited/3-dimensionial (height+lenght+width) facsimile of the vehicle's upper envelope surfaces, but not axle-count.

Thusly, the 2-dimensional more economically derived facsimiles herein generally provide sufficient data-information(height/length) via beam projections either from overhead via a central longitudinal trace-line (not transversely lane scanning). Or, scanned vertically from the side, enabling only 2-dimensional (height, length) facsimiles. However, a "limited/3-dimensional" (not yielding axle-count) facsimile is provided via employment of a full lane-breadth overhead scanning beam swept longitudinally.

C.) OBLIQUE-MEASUREMENT COMPONENT: Another object of this invention disclosure is to set forth a N/AVC (Non-cooperative automatic vehicle-classification)-system wherein a key component is the novel use of CW (continuous wave) Doppler-radar; the vital component providing the additional information necessary to accurately select the beam array output as discussed in preceding Item-B. When vehicles are traveling at higher speeds, the problem of resolving two vehicles in close-interval proximity has heretofore been particularly vexing. However, one characteristic that these two vehicles have in common is that their velocities are obviously very nearly the same;—hence, the Doppler effect return from each of these vehicles is inherently also very nearly the same. The separation of the vehicles is detected by the novel combination of the previously described profiling-window, which presently can distinguish a vehicle separation interval of as little as a few inches at normal velocities. In such possible event that a larger vehicle (such as a truck) is obscuring or masking the presence of a smaller vehicle (such as a motorcycle), then it is to provided that the velocity of the larger-vehicle is automatically assigned to that profiling-window signature registered by the smaller-vehicle, for the purposes of location calculation from the detected reference-point provided by the profiling window.

Known conventional radar-signal processing techniques filter out all but the strongest of signals, while coherent-processing furnishes indications of both forward, and reverse motions. Conventional coherent-processing provides for determination of Doppler offset and direction due to movement of the target vehicle in both approaching and receding directions;—meaning the received RF-signal frequency pattern is compared to the originally propagated RF-signal, via a stable oscillator device.

Suitably narrow radar antenna-beamwidth and oblique positioning of the antenna-beam relative to the longitudinal-axis (hereinafter referred to as the "longitude") of the vehicle entering the dedicated toll-station interrogation-lane, ensures the vehicle traversing the light-curtain's profiling-window shall generate the maximum returned signal.

The short-range of operation of the radar, enables a safely achieved low-level of radiated-energy, precluding the system misusing the returns from other leading and following vehicles as well as any signals from possible adjacent lane systems. The gating of the radar-data by the presence of the vehicle in the beams also serves to quell any false-alarms from adjacent vehicle-lanes of operation. The Doppler-radar provides for relative-distance data, to allow for sequential linear selection of the samples taken by the light-curtain (directly received) or beam-curtain (reflectively received) elements. Generally speaking, as presently implemented in our commercial hardware, the scanning procedure is such that a transverse reading is selected along every 6-inches of vehicle longitude. Hence, the higher the vehicle's profiling-window penetration-speed, the greater the number of full transverse sectional-scan samples necessarily saved and used in assembling the aggregate profile-facsimile;— regardless as to the vehicle's velocity, an identical number of sectional scan samples are always used. This is why the N/AVC-system is able to perform it's task so effectively, for without the precise sampling technique set forth herein, the scan-timing reactions (particularly in stop-and-go/back-up situations) would be so erratically spurious as to make it simply ineffectual in operation. Furthermore, if such a system were to rely upon slow sonic (speed of sound impulses) information impulses, instead of light (speed of light-impulses), it simply would not be workable as a practical matter.

Other advantages of the system include total versatility of automatic vehicle-classification both at high-speed (presently to 100-mph) or during stop-and-go congestion situations, including programming to even accommodate reverse-motion operation of lane vehicles. The AVC-system is also able to reliably detect trailer presence;—and, even make trailer-count, as well as axle-count and location, trailer length and height, plus reading of travel-rate (velocity). Additionally, this AVC-system offers ease of matching to changing toll-free rate-schedules.

Although the support-equipment employed in implementation of this invention is currently the state of the art for commercial system design, it is to be understood that as technology evolves, indeed the invention will continue to draw upon the latest support-equipment available by which to up-date the invention's product-design. For example, the present frequency of the Doppler-radar is preferably about 24.5 Ghz., and the antenna unit is presently of planar array type, having a preferred horizontal-beamwidth of 10-degrees, and a preferred vertical-beamwidth of 4-degrees. Generally, the radar is packaged in two separate units; the antenna xmitter/receive-unit is being packaged in a weatherproof module capable of withstanding wide temperature and humidity ranges associated with mounting in an open-air environment. The Doppler-radar/data-processor interface-unit is a closed unit capable of withstanding temperature and humidity ranges associated with indoor mounting in non-conditioned air;—and currently provides an 9-byte message, containing range and range-rate on three targets to the processor. This message is transmitted to the processor every 33 milliseconds. The interface will be a 9600/bps RS-232 interface for example.

The data-processor design,—preferably provides the following functions: a.) receipt of data from the Doppler-radar, b.) polling and receipt of data from the light-curtain, c.) detection of vehicle presence, d.) acquisition of the vehicle data, e.) generation of the profile, f.) determination of the vehicle type, g.) output of vehicle data to user, h.) self check (remote or local), i.) provide equipment operational quality status to the user.

The AVC processor can be made to operate in several ways: a preferred way being that the processor establishes tracked objects for each of the targeted returns from the radar. The position of the object which is penetrating the window is very carefully maintained until it leaves the profiler-window. During the time that the vehicle is within the profiler-window, the AVC-processor selects, based upon location and speed of the vehicle, the appropriate scans from the profiling sensor. Redundant (received during stop or backup) and intermediate (less than every 6 inches) scans are discarded by the AVC-processor as not being required (superfluous). The end of a vehicle is based upon the receipt of a blank scan from the profiling sensors. The AVC/data-processor then continues to monitor the output of the light-curtain (for example) looking for profiling-window penetration by another vehicle. Note, that this technique is applicable to either a lateral or an overhead profiling sensor.

Accordingly, another alternate, or optional combination manner of employing the just described CW/Doppler-radar apparatus, is in conjunction with the preceding Item-A's latter option of an overhead albeit downward looking light-curtain apparatus, possible of the laser type. Here again, a similar oblique orientation directed likewise toward the longitude of vehicles traversing a dedicated interrogation lane;—whereby in either installation the notion is to preferably position the antenna or radiation-aperture well above ground, preferably out of the way of a standing person. While the same positioning and equipment employed for the side-elevation profiling procedure is employable, so as to enable both the lateral looking and downward looking profiling-windows to share a common radar apparatus; some installations may require separate radar apparatus, particularly as to exact elevation positioning of the radiation-aperture device thereof.

The notion of combining feeds of both the side-elevation and the top/plan-view light-curtain information signal modalities in the data-processor, is so as to optimally obtain both longitudinal height and width measurements of a vehicle traversing the dedicated interrogation lane. Thereby enabling the data-processor to extrapolate still more refined data that is inherently possible via a single direction of profiling. Note that the overhead profiler may be one-dimension (reading height only transversely) or two-dimension (reading height and width transversely).

D.) COMBINED COMPONENT SIGNALS DATA-PROCESSING: Another object of this invention disclosure is to set forth an N-AVC (Non-cooperative automatic vehicle-classification)-system wherein the preceding two sensory components uniquely produce the vital inputs where are thus fed into a processing system able to discriminate between various vehicle types basically predicated on: a.)— length of a given the vehicle and any hitch location, number and relative positioning of axles, b.)—maximum-height/ average-height/and height variations, distinguishing the unique lateral-profile hole-pattern characteristics. Results of this comparative-data becomes interpolated in the specialized programming as the VCPA (vehicle-classification Profile-archive)-file can become rather sophisticated (extensive and complex);—dependent upon the quantity and quality of the program input parameters, which may vary from application to application.

The novelty of this system is especially reliant upon the unique processing of accurate velocity information derived from a first-sensor (the Doppler-radar), in instant conjunction with accurate vehicle reference-point profile-information derived from a second-sensor (and possible third-sensor overhead or side looking) source via the profiling-window,—during the time that it is within the surveillance reference-station of the interrogation lane.

This specific use of "accurate velocity & position data" discretely extrapolated via separate sensor types and vantage points, allows the system to take profile slice snapshot samples of the target-vehicle at very accurate stations along it's longitudinal axis. The set of light-curtain data-points thus accrued from an individual target-vehicle, is assembled as a dot-matrix pattern, which resulting varying envelope-contours of the incremental slices, ultimately enables digital comparison and segregation of the vehicle's profile type into one of a well predefined group of informational sets. These profiles are comparatively interfaced with predetermined vehicle-classification dot-matrix profiles, and precise definition of these sets can be easily redefined from application to application. Moreover, the vehicle types can be predefined by the system user into categories, which are comparatively interfaced with that real-time target-vehicle traveling along a one-dimensional (linear) path, but which is thus subsequently read only as two-dimensional (height and length), or possibly as three-dimensional (height, width and length) during the near-instantaneous comparison process.

The scan-processor is able to poll a single beam-cell in just 50-microseconds, with enough margin to ensure good operation even in somewhat obscure severe weather conditions (dirt, snow, rain, sleet, fog, etc.). Since the light-curtain beam array version preferably includes 58-beams, the entire array can thus be scanned in only 3.1-milliseconds. This facilitates processing of vehicles at speeds in excess of 100-mph at inter-vehicle separations of as little as 1-foot (thereby easily reading multi-trailers). The processor being able to handle all types of vehicle-motion, including negative speed (back-up). This signal will clearly and accurately indicate in real-time the front and rear of the vehicle to the end user, and as certain beams of the projected associated light-curtain become variously blocked by portions of the progressively intruding vehicle, so the resulting dot-matrix pattern is thereby progressively recorded by the central processor, providing a faithful real-time profile of the vehicle traversing the window-sector. Wherein, the leading-edge being the front of the vehicle, the trailing-edge being the rear, of the total vehicle. Note also that be it a bus, van, truck, car, pick-up truck, or motorcycle, the processor is able to identify if the vehicle is pulling a trailer having one or more axles.

Again, the notion of combining feeds of both the side-elevation light-curtain and the top/plan-view beam-curtain information signals in the data-processor as mentioned in preceding Item-C, is so as to perhaps optimally obtain both longitudinal height and width (plus length, as the vehicle advances) measurements of a vehicle traversing the dedicated interrogation lane.—Thereby enabling the data-processor to optionally extrapolate still even more refined data that is inherently possible via a single direction of profiling. For example, were a lateral direction of profiling showing a single motorcycle only, the added overhead direction of profiling will reveal presence of a second motorcycle moving beside the first (the second having been essentially masked in the shadow of the laterally projected light-curtain). But whether or not the added cost and complexity of obtaining such three-dimensional data readings is cost-effective remains an issue to be studied. Additionally, these related side and overhead directions of profiling may even be discretely switched on off independent of the other, according to changing operational requirements of the user.

DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the claims section annexed hereto; and accordingly, a better understanding of the invention and the variant uses is intended, by reference to the drawings, which are considered as primarily exemplary and not to be therefore construed as restrictive in nature; wherein:

FIG. 2, is a diagrammatic overhead/plan-view depicting a truck entering the lateral arrangement of radar and profiling-window componentry;

Figure 1:
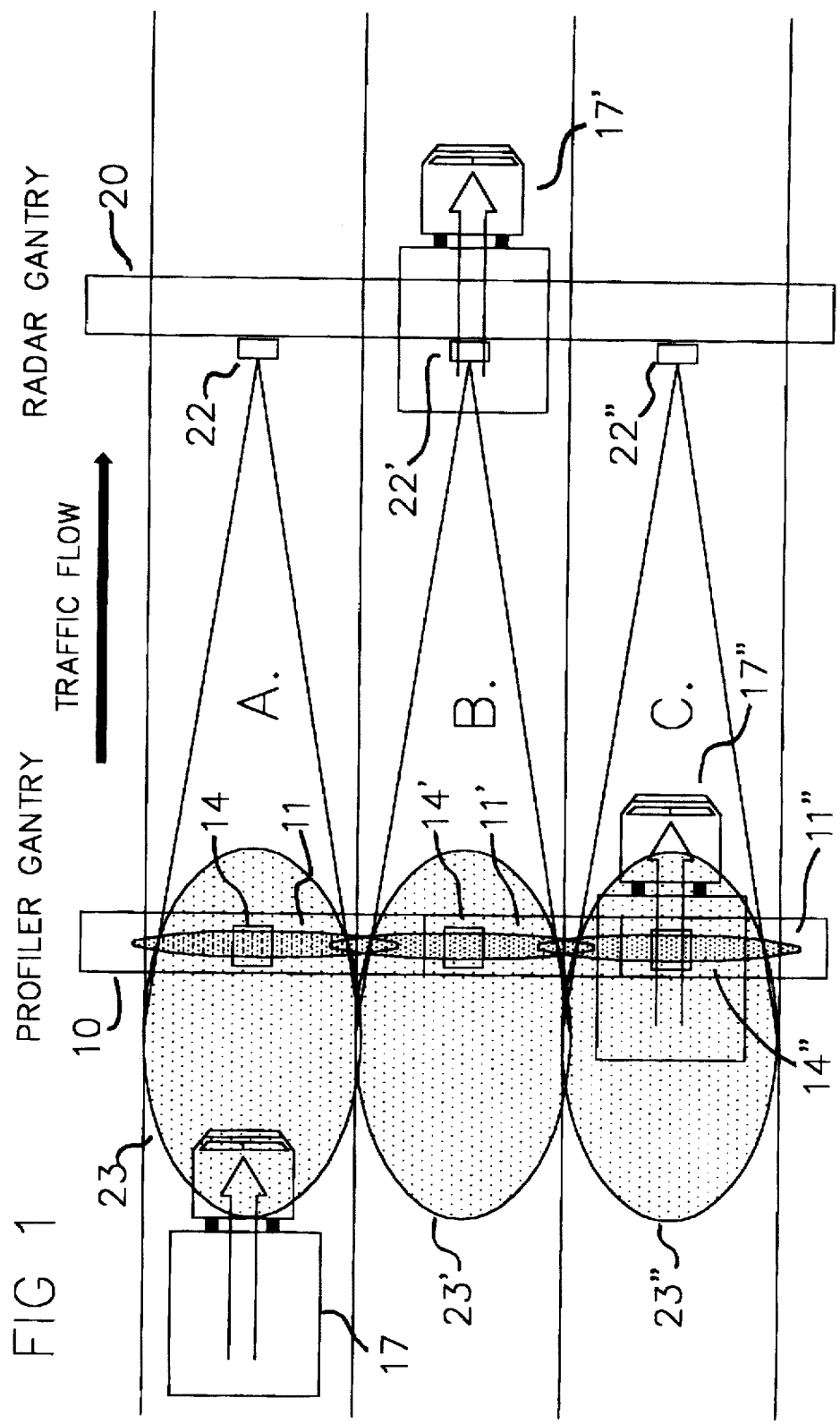
FIG. 1, is a diagrammatic overhead/plan-view depicting truck vehicles at different stages of traverse within a general toll-station environment having overhead apparatus.

FIG. 3/A, a diagram showing a single longitudinal tracking taken from overhead;

FIG. 3/B, is a diagram showing a plural longitudinal simultaneous tracking from overhead which has been skewed here to depict revelation of width, giving limited/3-D;

FIG. 4, is a simple block-diagram showing the basic flow of informational inputs and outputs relative to the N/AVC data-processor unit hereof;

FIG. 5, is a simple diagrammatic elevation-view depicting the profiling-window array;

FIG. 6/A, is a frontal/elevation-view revealing the general overhead projection arrangement;

FIG. 6/B, is a side/elevation-view thereof.

FIG. 7/A, is a diagrammatic side-elevation graphic-representation of the essential aggregate dot-matrix pattern exhibiting a large motor-vehicle superimposed thereupon;

FIG. 7/B, is the same diagrammatic side-elevation whereupon is delineated a hard outline of the truck thereof, for greater clarity.

ITEMIZED NOMENCLATURE REFERENCES

10—overhead profiler-gantry
11/11'/11"—projected beam-curtain
12—pencil beam
13/13'/13"—motorcycles
14/14'/14"—beam projection-housings
15—horizontal light-curtain
16/16'—stanchions (right/left)
17/17'—exemplified truck (plan-view/side-view)
18/18'/18"—2-dimensional profile (longitudinal-reading/vertical-reading/roadway-surface
19/19'/19"—3-dimensional profiling (first/second/third-readings)

20—Doppler-radar gantry
21—offside Doppler-radar housing
22/22'/22"—overhead Doppler-radar housings
23/23'/23"—Doppler-radar ground-spread patterns
24—dot-matrix occlusions
25—dot-matrix misses
26—vertical-scan
27—longitudinal-scan sequencing
28—clarifying delineation outline
29—typical axle/tire portion
30—data-processor
31—higher-echelon of operations

DETAILED DESCRIPTION OF THE PREFERRED EMBODIMENTS

Initial reference is given by way of FIG. 1 upper/plan-view, wherein is exhibited a three-lane (A/B/C) one-way portion of an ordinary existing highway dedicated to so called vehicle interrogation purposes. This example features an overhead profiler-gantry like structure 10 supporting a downwardly directed signal beam projection apparatus housings 12/12'12", serving either laser or radar profiling functions of the invention.

Included thereto is the exemplified projected-beam spreads 11/11'/11" propagated from these radar or laser apparatus, which are shown here to preferably overlap between identified lanes A-B and B-C. Reference to frontal/elevation-view FIG. 6-A and side/elevation-view 6-B reveals the relationship of the projected beam 11 to the simultaneous penetration and passage of exemplified motor-cycle vehicles 13 and 13', which would have been recorded as a single vehicle were the profiling beam of the alternate type projecting from the side as in FIG. 2. Note, that for purposes of this disclosure, the examples of FIGS. 1 and 2 are considered to both employ a lateral means of profiling beam propagation, the FIG. 1 representation being tantamount to a lateral, albeit overhead manner of propagation.

Also seen in FIG. 1 is an exemplified overhead gantry 20 supporting the associated discretely acting Doppler-radar apparatus housings 22/22'/22" which respectively project the Doppler-radar beams 21/21'/21" having respective ground spread patterns 23/23'/23" owing to the oblique angle of propagation relative to the longitudinal axis of the oblique angle of propagation relative to the longitudinal axis of the exemplified target truck vehicles 17/17'/17" traversing their respective lanes A/B/C thereto. While truck-A is only initially approaching the profiling-window in both FIGS. 1 & 2, truck B has already passed through, and truck-C is shown presently penetrating and moving through the profiling-window region of lane-C. The resultant image obtained of truck-C 17" can either be of 2-dimensional (height+length) character as shown in FIG. 3/A; or, can be of 3-dimensional (height+width+length) character as shown in FIG. 3/B. In all of the ensuing examples, it is the combination of this Doppler-radar's ability to provide accurate real-time velocity and coarse position information, in combination with various types of profiling beam (LED, laser, radar) based apparatus,—which forms the basis of novelty in this invention disclosure.

Note in this first embodiment of the invention, these images are obtained by means of a so called profiling-window which "beam-curtain" can range from a single pencil-beam directed down the center of lane-C (for example); or, the beam may be a fanned plurality of beams 11 (per FIG. 6/A, or only a single beam of widely focused breadth 11 (also per FIG. 6/A);—either substantially covering the lane transversely. The disadvantage of the single narrow laser-beam however is, that it could actually miss reading of either motorcycles as suggested in FIG. 6/A via emitting beam 12, while in comparison the beam spread (ref. arrow-x) of emitting beam 11 can not only reveal presence of a motorcycle, it will also reveal present of the two motorcycles;—by virtue of it's ability to make transverse slice reading FIG. 6/B (also ref. FIG. 1) of the empty spatial interval prevailing between the two vehicles.

There remain subtle, however vital other differences which are to become herein more evident and understood as important refinements. For example, study of FIG. 3/A reveals the particular image facsimile producable from the exemplified pencil beam 12, wherein one reads the roadsurface 18", the vehicle's longitudinal profile contours 18 (horizontal) and 18' (angled and vertical). While this degree of information is very useful, it is further improved upon via the arrangement of components shown in FIG. 2. The side-looking example of FIG. 2 has the distinct advantage of also reading axle-count as depicted in FIGS. 7/A and 7/B, wherein a special dot-matrix image facsimile likeness is employed. While FIG. 7/A constitutes the general effect of the hits (open-dots 24) and misses (solid-dots 25) communicated to the data-processor 30 of FIG. 4, the image has been somewhat enhanced (by visually connecting appropriate dots) via outline delineation 28 in FIG. 7/B to better reveal to the mind's-eye just what has been seen in this example. Thus, in FIG. 7/B one can now clearly see the longitudinal envelope profiling of truck 17' as it has passed through the profiling-window light-curtain 15 of FIG. 2. Note how the side-looking technique advantageously captures the exact number and location of wheeled-axles 29 among other features (although only the truck's door "open-windows" can be actually read, and wherein the tires/wheels will read as but a solid occlusion). Also note that the preferred orientation of the Doppler-radar apparatus 21 is both elevated and offset; hence, the radiation-aperture (which can include conventional discretely dedicated or dual-function transmit/receive antenna design means) is directed an oblique orientation relative to the longitude of the traversing vehicles.

The dot-matrix pattern method is attained via a special array of preferably inexpensive LED (light-emitting diodes) which are quite reliable and operable in the infrared spectrum, and are easily wired and housed in a suitably protective structure such as a vertical post like unit 16. Another similar stanchion 16' is thus to be positioned transversely opposite to stanchion 16, the stanchion 16' serving to house the like vertical array of receptor-units capable of cooperating with the emitter-units. Thus, in FIG. 5 is shown a frontal/elevation-view of the two necessarily cooperatively opposed stanchions 16/16' having some fifty-eight horizontally discrete beam emissions indicated here in total; and wherein is shown a concentrated array of emitter-beams in the lower sector of the vertically tiered array, while the center-sector is less concentrated in beam projections, and the upper-sector is even less concentrated;—owing that the lower sector acts to furnish the most varying of details such as wheel(axle)-count. As the vehicle progresses through the profiling-window of FIG. 2, a varying vertical dot-pattern is communicated to the data-processor 30 (FIG. 4) which information is near-instantaneously assembled (rather as slices in a loaf of bread can be longitudinally stacked) from the front to the vehicle to the rear of the vehicle. Hence, the light-curtain array in FIGS. 2 & 5 correlate to that depicted in FIGS. 7A/B (although for purposes of drawing clarity, an evenly spaced vertical array of only twenty dots is indicated), wherein ref. arrow-26 serves to indicate the initial vertical-scan action, and wherein ref. arrow-27 serves to indicate the initial sequential repeat of the vertical-scan procedure until the process has been completed at the final upper-left dot of each dot-matrix representation (FIGS. 7A/7B). If the truck of FIGS. 2 & 7 had included a second trailer-unit, then the sequence would not have been complete until that image was likewise conveyed to the data-processor 30 (FIG. 4). However, if the closely following unit were not a trailer of the exemplified truck 17, but a different vehicle, then the preprogrammed information within the data-processor having looked but not finding a trailer-hitch facsimile, would tag the subsequent penetration as a new-vehicle to be handled separately, etc..

Thus, while the overhead beam propagation example of FIG. 1 is generally not of the dot-matrix type as preferably depicted in FIG. 2, the information being conveyed to the AVC-processor unit 30 of FIG. 4 is similarly processed (via employment of pattern-recognition techniques to establish vehicle-classification typing against pre-determined distinguishing parameters of particular longitudinal envelope contouring), and the two methods of looking at the vehicle may be ideally interfaced, to actually cooperate advantageously in producing an envelope profiling contour which is quite replete in details in an ultimate 3-dimensional manner. In contrast, a comparatively limited 3-dimensional facsimile image of the same truck specimen entering as shown in lane-C of FIG. 1 for example, can be read as depicted in FIG. 3/B; wherein in lieu of the dot-matrixes technique set forth in FIGS. 2, 4 (indicia 15), 5, 7A/B, a nevertheless effective envelope image is obtained essentially only lacking the undercarriage details (which in many toll-station installations is considered vital information).

In FIG. 3/B the longitudinal profile information is similar to that of FIG. 3/A excepting that the transverse plurality of such measurement readings results in an image which assumes increasing faithfulness to the original article by virtue of full lane-breadth beam coverage and increased density of transverse information; that is, an assemblage of more sectional readings per indicia 19, 19" 19"" as compared to say sole narrow reading 18. Here, when the maximum breadth of the vehicle is detected (such as 18 and 19), the emitted beam simply nets a linear longitudinal reading instead of the hills and valleys making up the longitudinal profile. Since the currently cost-effective LED/light-curtain technique is presently not considered practical for overhead adaptation, use of other overhead radar or laser techniques is presently less than ideal, owing to the fan-like beam disbursal inherent in an economical single radiation-aperture means (See FIG. 5). As a plurality of overhead beam-emitters is added, the narrower imaging readings become less distorted (due to beam fanning parallax), but the cost of individual beam-emitters becomes a problematical factor.

In final reference to FIG. 4, I would like to point out again that the Doppler-radar apparatus inputs 21 and/or 22 (with their radiation-apertures vertically & transversely-offset/ vertically-offset only), may also be of a single Doppler-radar apparatus, while cooperating with dual inputs of the top profiler (downward looking) 14 and the side profiler 15. The higher echelon distination 31 can be various manner of operation not considered within the direct purview of scope of this disclosure;—ranging from compiling of mere statistical-data, to fully automated toll-fare equipment.

Thus, it is readily understood how the preferred and generic-variant embodiments of this invention contemplate performing functions in a novel way not heretofore available nor realized. It is implicit that the utility of the foregoing adaptations of this invention are not necessarily dependent upon any prevailing invention patent; and, while the present invention has been well described hereinbefore by way of certain illustrated embodiments, it is to be expected that various changes, alterations, rearrangements, and obvious modifications my be resorted to by those skilled in the art to which it relates, without substantially departing from the implied spirit and scope of the instant invention. Therefore, the invention has been disclosed herein by way of example, and not as imposed limitation, while the appended claims set out the scope of the invention sought, and are to be construed as broadly as the terminology therein employed permits, reckoning that the invention verily comprehends every use of which it is susceptible. Accordingly, the embodiments of the invention in which an exclusive property or proprietary privilege is claimed, are defined as follows.

What is claimed of proprietary inventive origin is:

1. An electronically automated vehicle-identification and vehicle-classification system producing accurate statistical-data especially useful for auditing toll-collection; comprising the combination of:

a Doppler-radar means including a radiation-aperture apparatus facilitating coincidental transmit/receive signal propagation directed obliquely relative to the longitude of vehicles traversing a dedicated interrogation lane, thereby providing accurate real-time velocity-information and coarse position-information about the vehicles;

a profiler means including laterally propagated beams providing successive real-time measuring of individual vehicles traversing a profiling-window station-point of reference arranged laterally to the vehicle longitude;

a digital data-processor means capable of discriminating and combining appropriate real-time output-data from information extrapolated from both said Doppler-radar means and said profiler means, thereby near-instantaneously accruing the incremental slices of said vehicle into an assemblage forming a longitudinal envelope contour-profile matching with closest one of a set of predefined vehicle longitudinal characteristic profile classifications.

2. The apparatus according to claim 1, wherein said Doppler-radar means is of narrow-band continuous-wave type with coherent signal, capable of simultaneously resolving and reporting up to three separate vehicles.

3. The apparatus according to claim 1, wherein said propagated beams are governed sequentially by a scan-controller and said profiling-window consists of laterally projected array of vertically tiered beam-emitters arranged relative to an oppositely directed vertically tiered array of beam-receptors, providing a penetrable transversely staged light-curtain wherein particular occlusions occuring during vehicle passage there through generate an aggregation of particularly occluded station readings totaling a dot-matrix pattern facsimile of the vehicle's characteristic longitudinal profile.

4. The apparatus according to claim 3, wherein said beam-emitters are infrared-lamps, the light potential from each corresponding tiered infrared-lamp being discretely projected from a fixed lateral station-point arranged along an outer-margin of the lane relative to the opposing recaptor array.

5. The apparatus according to claim 3, wherein beam-receptors are infrared-sensors, the light beam projected to each corresponding tiered infrared-sensor being discretely received from a fixed lateral station-point arranged along an outer-margin of the lane relative to the opposing light beam emitter array.

6. The apparatus according to claim 3, wherein said occlusions occuring in said profiling-window station are the light-curtain's overall non-received beam emissions, certain beams being variously blocked by portions of the progressively traversing vehicle, said dot-matrix pattern thereby conveying faithful envelope profile contours of the vehicle traversing said profiling-window.

7. The apparatus according to claim 3, wherein said light-curtain entails a plurality of light-emitters projecting upon a matching quantity and quality of light-receptors, each said tiered level of discretely paired emitter/receptor thereby interacting with it's respective paired unit in a binary manner relative to varying traversing vehicle beam occlusions.

8. The apparatus according to claim 3, wherein said vertically tiered array of beam-emitters are protectively housed in a special upright stanchion arranged laterally opposite to the vertically tiered array of beam-receptors also housed within an opposite upright stanchion; whereby beams thus comprising said light-curtain are projected transversely across the reference-station's profiling-window staged there between the opposing tiered array to detect presence of a penetrating vehicle.

9. The apparatus according to claim 3, wherein said beam-emitters and beam-receptors are supported upon discete dual opposed vertical stanchions, one of the stanchions serving as a laterally projecting beam emitter the opposing stanchion serving as a laterally directed beam receptor; a penetrable transverse said profiling-window being thus in effect staged between the stanchions.

10. The apparatus according to claim 1, wherein said radiation-aperture apparatus is a transmit/receive-antenna of the type whereby transmit and receive functions are facilitated simultaneously via a dual-function design capability.

11. The apparatus according to claim 1, wherein said radiation-aperture apparatus includes a transmit-antenna and a separate receive-antenna.

12. The apparatus according to claim 1, wherein vehicle's contour-profile is segregated by said data-processor employing pattern-recognition techniques to establish vehicle-classification typing against pre-determined distinguishing parameters of particular longitudinal envelope contouring including length, height, axle count and location, trailer-hitch presence.

13. The apparatus according to claim 12, wherein said vehicle-classification type is segregated by said data-processor employing pattern-recognition techniques to establish toll classification type such as, motorcycle, car, limousine, pick-up truck, large-truck, semi-truck, and any of these with/without one or more trailer.

14. The apparatus according to claim 1, wherein the non-cooperative electronic AVC-system is operationally compatible with the cooperative AVI-systems employing active on-board devices such as an information transponder.

15. The apparatus according to claim 12, wherein said data-processor is capable of accurately compiling profile generation and classification of vehicles during forward and reversal of motion while penetrating said profiling-window.

16. The apparatus according to claim 12, wherein said pattern-recognition technique is capable of separation, profile generation, and classification of vehicles in close interval successively penetrating said profiler with a variation of velocities.

17. The apparatus according to claim 1, wherein said profiler means includes overhead means directing the signal propagation downwardly, thereby providing transverse height measurement readings along longitude of the vehicle.

18. The apparatus according to claim 17, wherein said downwardly directed propagation is via either a laser apparatus or a radar apparatus capable of generating signal readings to the data-processor.

19. The apparatus according to claim 1, wherein said profiler means includes overhead means directing the signal propagation downwardly, thereby providing transverse height and width measurement readings along longitude of the vehicle.

20. The apparatus according to claim 19, wherein said downwardly directed propagation is via either a laser apparatus or a radar apparatus capable of generating signal readings to the data-processor which are either 2-dimensional or limited 3-dimensional in character.

21. The apparatus according to claim 1, wherein said slice readings can be taken from either a side-elevation direction, or a top/plan-view direction; or, with combined said profiler means function capability, readings can be taken simultaneously via both the directions for ultimate 3-dimensional vehicle envelope information.

\* \* \* \* \*